June 18, 1963 E. J. SUPERNOWICZ 3,094,699

SYSTEM FOR MAGNETICALLY RECORDING DATA

Filed March 3, 1959 2 Sheets-Sheet 1

*INVENTOR.*
EDWARD J. SUPERNOWICZ
*BY* Richard C. Cummins
ATTORNEY.

United States Patent Office 3,094,699
Patented June 18, 1963

3,094,699

SYSTEM FOR MAGNETICALLY RECORDING DATA

Edward J. Supernowicz, Santa Clara County, Calif., assignor to International Business Machines Corporation, New York, N.Y., a corporation of New York Filed Mar. 3, 1959, Ser. No. 796,893
6 Claims. (Cl. 346—74)

This invention relates in general to magnetic recording and in particular to an improved storage element and system for recording binary coded data in the storage element.

Conventional arrangements for recording binary coded data in a magnetic storage member usually employ a magnetic transducer which is disposed in flux exchanging relationship with the surface of the member and positionable to discrete areas of the storage member, defined by unique addresses, by an access mechanism. Since the speed at which any data processing system operates is directly related to the time required to move the transducer from one selected data storage location to another, attempts have been made to reduce the physical size and mass of the transducer and its positioning mechanism in order to decrease access time. However, it will be appreciated that since some sort of core member, a current carrier and positioning means, must be provided for the assembly, a limit is reached on the minimum mass obtainable. While this limit may be made quite small, it is extremely large compared to the mass of a beam which may be electronically positioned and hence considerable advantage is obtained in processing speed when a beam is employed.

The prior art has disclosed data storage devices which employ light beams or electronically positioned beams for recording binary data. However, the binary data as stored by these arrangements is either nonpermanent or else not readily erasable. Hence, these storage devices are limited in their application to particular data processing systems.

The present invention is directed to a storage element and a system for recording data in the element so that it is permanent in nature but also readily erasable. In accordance with the present invention, data is recorded in a magnetizable member, preferably a thin film, having a preferred direction of magnetization by first magnetizing the film in a direction other than the preferred direction and then subjecting discrete areas at selected locations to a thermal condition to cause localized heating of the material below the Curie point to effect a change in the direction of magnetization of the discrete areas towards the preferred direction.

It is therefore an object of the present invention to provide an improved system for storing data in a magnetizable recording surface.

Another object of the present invention is to provide a data storage system embodying a controlled beam for storing data in records which are permanent in nature but also readily erasable.

Other objects of the invention will be pointed out in the following description and claims and illustrated in the accompanying drawings which disclose, by way of example, the principle of the invention and the best mode which has been contemplated of applying that principle.

In the drawings:

FIG. 1 illustrates schematically a magnetic recording system embodying the present invention.

FIGS. 2*a* through 2*c* are greatly enlarged sectional views of the storage element employed in the system of FIG. 1.

Figure 1:
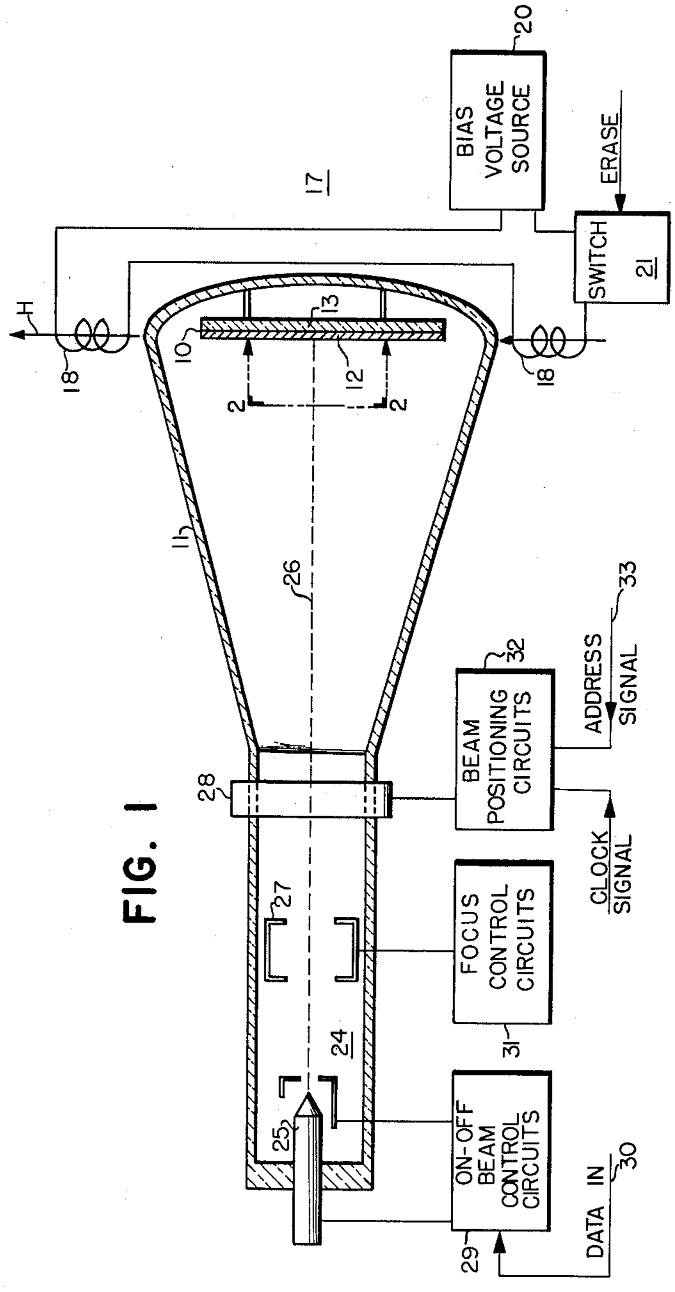
Figure 2A:
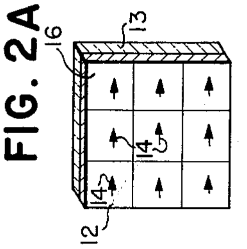

Referring to the drawings, and particularly to FIG. 1, a system is illustrated for storing binary coded data signals in a storage element 10 which is mounted at the large end of a conventional cathode ray tube 11. A portion of the element 10 is shown in FIG. 2*a* and is preferably a thin film 12 of magnetic material which is vapor plated on a glass substrate member 13, so that the film has a preferred or easy direction of magnetization indicated by arrows 14 and a hard direction of magnetization indicated by arrows 15 in FIG. 2*b*. Magnetic materials which have both easy and hard magnetization directions transverse to each other are well known in the art and, hence, a detailed description of such materials does not appear necessary to an understanding of the present invention. In general, such characteristics are obtained in the material by mechanically stressing the material in a predetermined direction during manufacture or in the case of vapor deposited thin films by applying an external magnetic field to the film during the plating process.

Such material therefore has at least two stable states, the first of which corresponds to the material being magnetized in the easy direction, and the second of which corresponds to the material being magnetized in the hard direction. As shown in FIG. 2*a*, the storage element 10 may be divided into a relatively large number of discrete storage locations, referred to hereafter merely as cells 16. The cells 16, as shown, are arranged adjacent each other in columns and rows, the approximate dimensions of a typical cell 16 in the storage element 10 of FIG. 1 being about 1 mil square.

Referring again to FIG. 1, the apparatus further includes magnetic means 17 for changing the storage cells from the first stable state wherein the cells are magnetized in the easy direction 14 to the second stable state wherein the cells are magnetized in the hard direction 15 transverse to the easy direction. In this instance magnetic means 17 comprises a pair of biasing coils 18 for providing an external magnetic field H which is 90° to the easy direction, a source of bias voltage 20 and a suitable electronic switch 21. The bias voltage source 20 is connected to the coils 18 through the electronic switch 21 which is only open during application of an erase signal to the switch. The storage cells 16 of the element 10 are therefore switched from a first stable state shown in FIG. 2*a* to a second stable state shown in FIG. 2*b* by means 17 under control of the erase signal.

The apparatus further includes a thermal transducer means for changing the state of selected cells 16 of the storage element 10 from the second stable state back to the first stable state by subjecting each selected cell 16 to localized heating without destroying the magnetic properties of the film. The thermal transducer means in this instance comprises a conventional electron beam generating unit 24 similar to that employed in well known cathode ray tubes or television systems. Generating unit 24 includes an electron gun 25 for producing the beam 26, a focus coil 27 for focusing the beam 26, and a deflection coil 28 for controlling the position of the beam 26 and for stepping it from one storage cell 16 to the next. The intensity of the beam 26 is controlled by the beam on-off control circuits 29 in response to binary coded data signals supplied to the data entry line 30. It is assumed, for purposes of explanation, that a positive data pulse corresponding to binary 1 supplied to control circuit 29 turns the beam 26 on for the period of the pulse and in the absence of a positive data pulse, indicating either no data or a binary 0, that the beam 26 is turned off.

The focusing of the beam 26 is achieved by means of the focus coil 27 connected to a suitable focus control circuit 31. The deflection coil 28 is connected to a suitable beam positioning circuit 32 which supplies the appropriate voltage to the deflection coil 28 in response to an address signal supplied to address line 33 to cause the beam 26 to impinge on the cell 16 corresponding to the address signal.

Figure 2B:
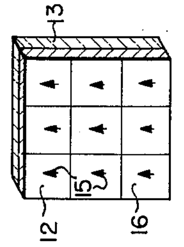
Figure 2C:
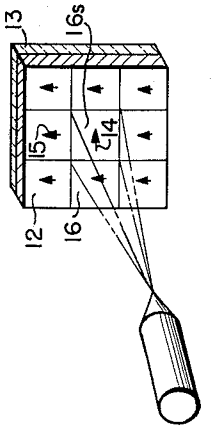

The action of the beam 26 impinging on a selected cell 16 is shown in FIG. 2*c*. The energy of the electrons in the beam 26 as they strike the selected cell **16*s* is converted into heat causing the temperature of the film in the cell area to be increased. The intensity of the beam 26 and the time that the cell is subjected to the beam are arranged so that the temperature of cell 16*s* is increased to a point sufficient to reduce the coercivity of the cell to a predetermined level but still not destroy the magnetic properties of the cell. For example, a cell 16 made of a ferromagnetic film of 80% cobalt and 20% nickel having a thickness of 5000 angstroms and biased in the hard direction 15 may be raised to a temperature range between 50° C. and 300° C. by subjecting it to a 10 kv. electron beam employing a current range of 10 to 80 microamps. for 8 microseconds. The upper limit of this temperature range is more than sufficient to cause the direction of magnetization of the subjected cell 16*s* to change from the hard direction 15 back towards the easy direction 14**. It should be noted that the Curie point of such a film, that is, the temperature at which the magnetic characteristics of the material are destroyed, is approximately 500° C. so that the temperature range at which the material rotates back to its original state is well below this point.

It will thus be seen that by supplying data signals to the on-off beam control circuits 29 in timed relationship with suitable clock signals employed to sweep the beam 26 across successive cells 16, one bit of binary information may be stored in each cell 16.

Assuming the electron beam generating unit 24 is suitably energized, the data recording apparatus shown in FIG. 1 operates as follows. An erase signal is supplied to the electronic switch 21 connecting the bias coils 18 to the bias voltage source 20. This causes each cell 16 of the storage element 10 to be magnetized in the hard direction 15 as indicated in FIG. 2*b*. An address signal is also supplied to the beam positioning circuits 32 via line 33 which supplies appropriate deflection voltages to the deflection coil 28 so that the beam 26 is positioned to the selected cell 16. The binary coded data signal to be recorded is then supplied to the beam on-off control circuits 29 in synchronism with a clock signal supplied to the positioning circuit 32. The electron beam 26 is swept across successive cells 16. At each cell 16 the beam 26 is in position to record data. If a binary 0 is to be recorded, the beam 26 is maintained in its normally cut off state. However, if a binary 1 is to be recorded, the binary 1 data pulse unblanks the beam for a predetermined period causing the temperature of the appropriate cell 16 to be raised. The direction of magnetization of the cell 16, e.g., cell **16*s***, changes back to the easy direction as shown in FIG. 2*c* and the beam 26 is moved to the succeeding cell.

It should be noted that, depending on the particular data processing application being performed, the beam 26 may be randomly positioned to any selected data cell 16 or, alternatively, the positioning circuits 32 may be arranged so that the beam traces a raster-like pattern continually with data signals controlling the on-off condition of the beam at times corresponding to an address signal.

The manner in which the stored data is read forms no part of the present invention and hence is not illustrated. However, it should be understood that various arrangements are possible. For example, the system disclosed in copending application Serial No. 790,249, filed January 30, 1959, and assigned to the assignee of the present invention, wherein the direction of magnetization of a cell 16 being read controls the return path of electrons to a pair of semicircular collector plates in the cathode ray tube may be employed. Alternatively, the storage element 10 may be made so that it is removable from the tube 11 and presented to a conventional magnetic transducer for reading in the normal manner. In any event, prior to entry of data in the same address the stored data is erased by application of an erase signal to the electronic switch 21 and the apparatus is again in condition to record data.

Figure 3:
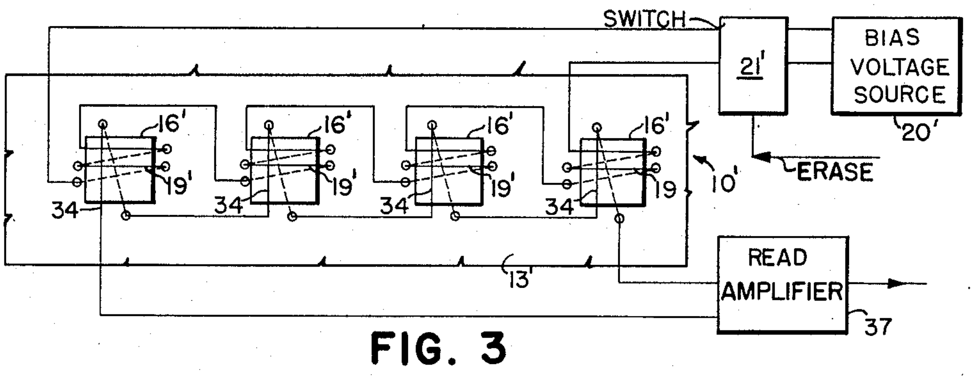
FIG. 3 illustrates schematically a modification of the recording system shown in FIG. 1 to provide a buffer type storage unit.
Figure 4:
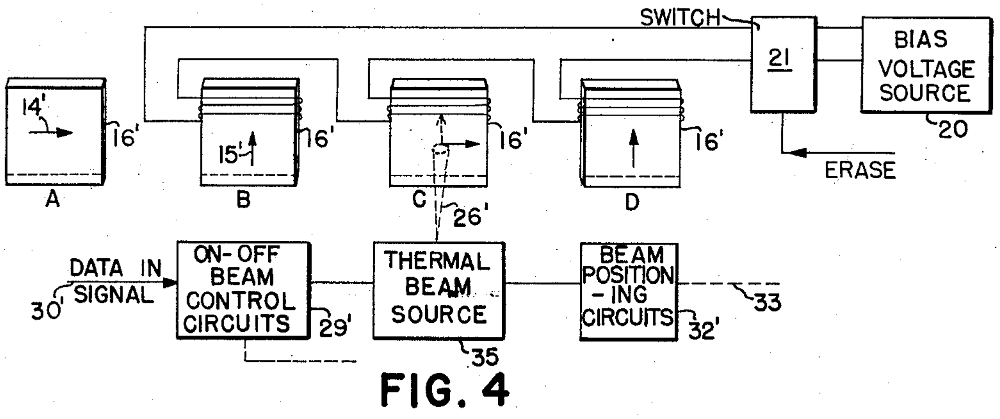
FIG. 4 illustrates diagrammatically entry of information into the buffer storage system shown in FIG. 3.
Figure 5:
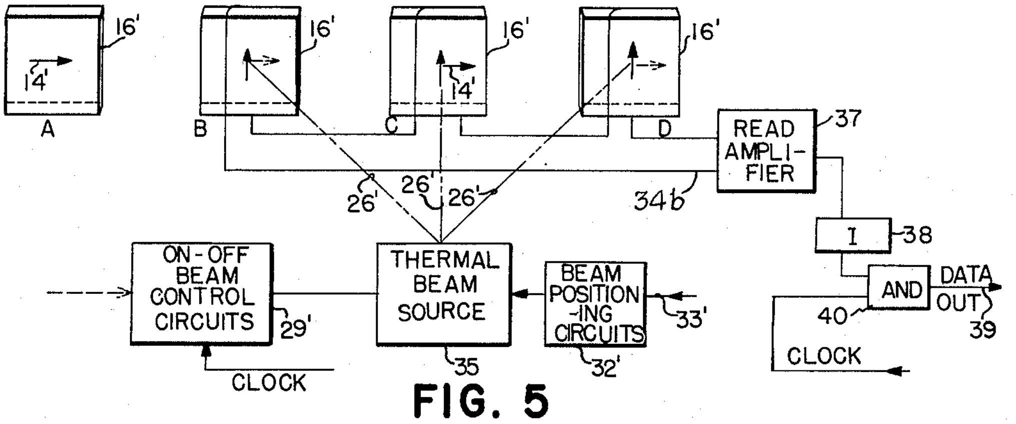
FIG. 5 illustrates a retrieval of information from the buffer storage unit shown in FIG. 3.

FIGS. 3 through 5 illustrate an application of the present invention in a buffer-type data storage system. FIG. 3 illustrates a portion of a memory element 10′ which comprises a plurality of magnetic thermal memory elements 16′. The elements 16′ are vapor plated on a glass substrate member 13′ and are similar, except for their size, to the cells 16 of the storage element 10 shown in FIG. 1. A memory element 16′ therefore comprises a thin film of magnetic material which has two stable states of magnetization, an easy direction indicated by the horizontal arrows 14′ and a hard direction indicated by the vertical arrows 15′ (FIG. 4). Each memory element 16′ further includes a bias coil 19′ and a sense coil 34. As shown in FIG. 3, each bias coil 19′ provides an external magnetic field parallel to the hard direction 15′ of magnetization, the bias coils 19′ of the elements 16′ being connected in series to a source 20′ of bias voltage through a normally open electronic switch 21′ which is closed in response to an erase signal. The coils 19′ may be connected individually to the bias source through a plurality of suitable switches if selective operation is desired.

The sense coil 34 of each element is disposed 90° to the corresponding bias coil 19′ and, as shown, the sense coils 34 of all the elements are connected in series to a read amplifier 37. It will, of course, be obvious that while only four magnetic thermal memory elements 16′ are shown, any number of elements may be provided on the substrate member 13′ depending on its size. In practice each element may be approximately one-quarter inch square.

A thermal beam source 35 is employed to enter data into the storage elements 16′. The thermal beam source 35 is shown in block form in FIG. 4 in that any suitable source of thermal energy may be employed. For example, the thermal beam employed in connection with the system of FIG. 1 may be used, if desired, in which case the member 10′ would be positioned in the tube 11 of FIG. 1 similar to the positioning of the member 10. Alternatively, the thermal beam source 35 may be an infrared light source which is directed to the various storage elements 16′ through a suitable lens system. The on-off condition of the thermal beam 26′ is controlled in accordance with the condition of the data signal through the on-off beam circuits 29′.

The function of the infrared beam is exactly the same as the electron beam, namley to raise the temperature of the storage elements 16′ to the predetermined range in which the coercivity of the material is lowered to a point which allows the direction of magnetization of the material to return to the easy direction.

Figure 6:
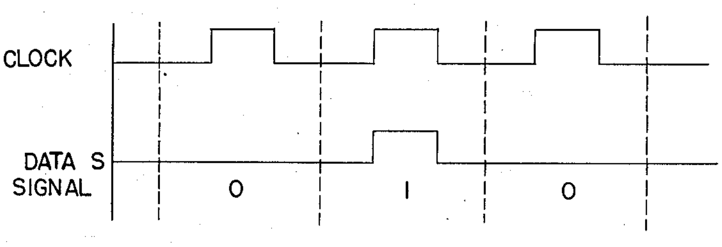
FIG. 6 is a graph illustrating signals at various points in the system of FIG. 3 during entry and retrieval of information.

The entry of binary data into the storage element is obtained by an operation similar to that disclosed in connection with the system of FIG. 1. A data entry operation shown by FIG. 4 comprises the steps of applying an erase signal to the switch 21′ which causes the direction of magnetization of each memory element 16′ to change from the easy direction 14′, as shown by element A, to the hard direction 15′, as shown by element B. Assume, for purposes of explanation, that a three-bit binary data signal 0–1–0, shown in FIG. 6, is to be stored in elements B, C and D in FIG. 4 and that the thermal beam 26′ is being swept across the row of elements B, C and D in synchronism with the data signal by means of the beam positioning circuits 32′. When the beam 26′ is directed to element B, the first "0" bit maintains the beam 26′ in the off condition so that element B is not affected. As the beam is directed to element C, the "1" bit pulse of the data signal causes the beam to be turned on so that the direction of magnetization of element C changes from the hard direction 15′ to the easy direction 14′ in response to the heat generated by the beam. As the beam 26′ is directed to element D, the third bit which again is a "0," shuts off the beam so that element D is not affected. The direction of magnetization of elements B, C and D at this time is represented in FIG. 4 by the solid arrows.

A sense operation is shown diagrammatically in FIG. 5. In order to sense the stored data the thermal beam 26′ is turned on and directed to each of the elements B, C and D in succession. If the storage element 16′ contains a "0," the direction of magnetization changes from the hard direction 15′ to the easy direction 14′ in response to the beam's thermal action. This change in direction is sensed by the sense coil **34*b* which supplies the signal to the read amplifier 37. If, on the other hand, the element contains a "1" as element C in FIG. 5 wherein the direction of magnetization is already in the easy direction 14′, no signal is produced. Element D in which a "0" is stored, when subjected to the beam 26′ also provides a signal to the read amplifier 37 in the same manner as element B. While the read signals supplied to the amplifier 37 are in a sense 180° out of phase with the convention adapted for the write signals, they may be inverted by any suitable means such as inverter 38 and supplied to the data-out line 39 under control of signals from a clock supplied to AND gate 40. Prior to entry of other information into the memory elements 16′, an erase signal is supplied to switch 21′ so that each element 16′ is again biased in the hard direction 15′**.

While the invention has been disclosed in terms of two specific applications, it will be obvious that other modifications are possible. For example, thermal beam sources, other than the electron beam and infrared light sources, which perform the same function of heating a discrete area to a predetermined temperature range may be employed. Likewise, other conventional arrangements for positioning a selected area relative to the beam may be employed. It is the intention, therefore, to be limited only as indicated by the scope of the following claims.

What is claimed is:

1. A storage unit for binary data representations comprising a plurality of spaced storage elements each of which includes a film of magnetic material, said material having a preferred direction of magnetization which is stable below the Curie point of the material and a transverse unpreferred direction which is stable in a first temperature range and unstable in a second temperature range, said second range being between said first range and said Curie point, a bias coil associated with each said element and adapted when energized to provide an external magnetic field having an axis parallel to said unpreferred direction to magnetize said material in said unpreferred direction and means for subjecting selected ones of said storage elements to a thermal condition in accordance with said data representations to raise the temperature thereof to within said second temperature range to cause the direction of magnetization of the selected elements to change from said unpreferred direction to said preferred direction.

2. An apparatus for magnetically recording binary data signals comprising a planar storage element comprising magnetic material having a preferred direction of magnetization which is stable below the Curie point of the material and a transverse unpreferred direction which is stable in a first temperature range and unstable above said range, both said ranges being below said Curie point, magnetic means disposed in flux engaging relationship with said element to bias said element in said unpreferred direction in response to a first signal, a beam generating unit for generating a thermal beam, means for positioning said thermal beam to selected areas of said storage element in response to address signals, and means connected to said generating unit to control the on-off condition of said beam in response to said binary data signal, said beam in its on condition causing the temperature of said selected area to elevate above said first temperature range but below said Curie point whereby the magnetization of said selected area subjected to the on condition of said beam changes from said hard direction to said easy direction.

3. An apparatus for magnetically recording binary data signals comprising an evacuated enclosure, a planar storage element comprising magnetic material having a preferred direction of magentization which is stable below the Curie point of the material and a transverse unpreferred direction which is stable in a first temperature range and unstable above said range, both said ranges being below said Curie point, means mounting said element in one end of said enclosure, magnetic means disposed in flux engaging relationship with said element to bias said element in said unpreferred direction in response to a first signal, a beam generating unit mounted at the other end of said enclosure for generating a thermal beam, means for positioning said thermal beam to selected areas of said storage element in response to address signals, said beam in its on condition causing the temperature of said selected area to elevate above said first temperature range but below said Curie point, and means connected to said generating unit to control the on-off condition of said beam in response to said binary data signals whereby the direction of magnetization of a selected area subjected to the on condition of said beam changes from said hard direction to said easy direction.

4. The invention recited in claim 3 in which said beam generating unit comprises an electron gun and said thermal beam is an electron beam.

5. A storage unit for binary data representations comprising a plurality of spaced storage elements each of which includes a film of magnetic material, said material having a preferred direction of magnetization which is stable below the Curie point of the material and a transverse unpreferred direction which is stable in a first temperature range and unstable in a second temperature range, said second range being between said first range and said Curie point, a bias means associated with said elements and adapted when energized to provide an external magnetic field having an axis parallel to said unpreferred direction to magnetize said material in said unpreferred direction, means for subjecting selected ones of said storage elements to a thermal condition in accordance with said data representation to raise the temperature thereof to within said second temperature range to cause the direction of magnetization of the selected elements to change from said unpreferred direction to said preferred direction, and means for testing each of said elements individually to distinguish those elements which are magnetized in unpreferred direction from those elements which are magnetized in said preferred direction.

6. A storage unit for binary data representations comprising a plurality of spaced storage elements each of which includes a film of magnetic material, said material having a preferred direction of magnetization which is stable below the Curie point of the material and a transverse unpreferred direction which is stable in a first temperature range and unstable in a second temperature range, said second range being between said first range and said Curie point, a bias coil associated with each said element and adapted when energized to provide an external magnetic field having an axis parallel to said unpreferred direction to magnetize said material in said unpreferred direction, thermal means, first means associated with said thermal means to subject selected ones of said storage elements to a thermal condition in accordance with said data representation to raise the temperature thereof to within said second temperature range to thereby cause the direction of magnetization of the selected elements to change from said unpreferred direction to said preferred direction, second means associated with said thermal means and selectively energizable after said first means for causing said thermal means to subject all of said storage elements to a thermal condition to raise the temperatures of said elements to within said second temperature range whereby the direction of magnetization of any element magnetized in its unpreferred direction is caused to change to its preferred direction, and sense means rendered responsive by the operation of said second means associated with each said storage element for detecting a change in the magnetization direction of said element from said unpreferred direction to said preferred direction.

References Cited in the file of this patent

UNITED STATES PATENTS

| | | |
|---|---|---|
| 2,793,135 | Sims et al. | May 21, 1957 |
| 2,793,288 | Pulvari | May 21, 1957 |
| 2,857,458 | Sziklai | Oct. 21, 1958 |
| 2,910,229 | Bolton | Oct. 27, 1959 |
| 2,926,336 | Chynoweth | Feb. 23, 1960 |

FOREIGN PATENTS

| | | |
|---|---|---|
| 770,127 | Great Britain | Mar. 13, 1957 |